United States Patent [19]

Simkin

[11] Patent Number: 5,405,912

[45] Date of Patent: Apr. 11, 1995

[54] POWDER COATING COMPOSITIONS CONTAINING VDF/TFE/HFP TERPOLYMERS

[75] Inventor: Benjamin Simkin, Audubon, Pa.

[73] Assignee: Elf Atochem North America, Inc., Philadelphia, Pa.

[21] Appl. No.: 90,871

[22] Filed: Jul. 13, 1993

Related U.S. Application Data

[62] Division of Ser. No. 892,457, Jun. 2, 1992, abandoned.

[51] Int. Cl.$^6$ ............................................. C08L 27/12
[52] U.S. Cl. .................................... 525/199; 523/220; 524/520
[58] Field of Search ........................ 523/200; 524/520; 525/199

[56] References Cited

U.S. PATENT DOCUMENTS

5,229,460  7/1993  Yousuf et al. ...................... 525/198

*Primary Examiner*—Paul R. Michl
*Assistant Examiner*—U. K. Rajguru

[57] ABSTRACT

The use of VDF/TFE/HFP terpolymers in PVDF based powder coating resins to enhance the aesthetics of coatings made therefrom.

3 Claims, No Drawings

POWDER COATING COMPOSITIONS CONTAINING VDF/TFE/HFP TERPOLYMERS

This is a divisional of application Ser. No. 07/892,457, filed on Jun. 2, 1992, now abandoned.

FIELD OF THE INVENTION

The present invention relates to polyvinylidene fluoride ("PVDF") based powder coatings and processes for preparing them. More particularly, it relates to the use of a vinylidene fluoride/tetrafluoroethylene/hexafluoropropylene ("VDF/TFE/HFP") terpolymer in such coatings in order to make an aesthetic, functional coating with a smooth surface.

BACKGROUND OF THE INVENTION

PVDF based coatings (or "paints") have been used and are known to be very good protective coatings for various substrates. They have excellent resistance to weathering and chemical attack.

The traditional method for preparing PVDF based paint has been to formulate a liquid dispersion coating. The liquid vehicle has traditionally been a solvent, but increased environmental laws and regulations have made it more difficult and costly to handle and recover such solvents. Thus, there is a need for solvent-less PVDF based coating systems.

PVDF based powder coatings have traditionally exhibited a certain amount of surface roughness, commonly known as "Orange Peel." This undesirable Orange Peel surface has affected the market acceptance of PVDF based powder coatings as a viable alternative to the liquid, solvent based PVDF coatings.

There are a number of ways which have been tried to reduce the amount of Orange Peel. One is to reduce the melt viscosity of the PVDF resin, but this generally has an adverse effect on the mechanical properties of the coating, such as resistance to impact and flexibility. Another approach, disclosed in European Patent Application 284,996, is to use a coalescing additive which is substantially volatilized from the coating during coalescence; this, however, again introduces the problem of release of solvents. Still another alternative proposed in U.S. Pat. No. 4,770,939 is the incorporation of an acrylic flow modifier, but this is described by the patentee as "not essential."

SUMMARY OF THE INVENTION

A pigmented blend useful for powder coatings is provided comprised of PVDF resin, a thermoplastic acrylic resin, a pigment, and about 0.1 to 5 weight percent, based on the weight of the blend, of a VDF/TFE/HFP terpolymer. Other embodiments of the invention include a process for making a pigmented powder coating composition comprising the steps of blending the foregoing components, pelletizing, and cryogenically grinding, as well as a process of coating a substrate comprising the steps of applying the coating composition on the substrate, heating the composition above its melt temperature, and cooling of the substrate and applied coating composition.

DETAILED DESCRIPTION OF THE INVENTION

It has now been found that incorporation of a small percentage of a VDF/TFE/HFP terpolymer into a blend of PVDF resin, compatible thermoplastic acrylic resin, and pigment results in a coating that has fewer defects (craters and poc marks) and a smoother appearance.

The term PVDF refers not only to the homopolymer of VDF but also to the copolymers prepared from at least about 85% by weight of VDF monomer. Comonomers may include other fluorinated monomers such as TFE, HFP, and vinyl fluoride. The homopolymer is preferred.

The PVDF resins that are preferred are those with a melt viscosity (according to ASTM D3835) in the range of about 6,000 to 13,000 poise at 232 degrees Centigrade, preferably 6,000 to 8,000 poise, a melt flow index (ASTM D1238) of about 20 to 35 g/20 min. at 3.8 Kg and 230 degrees Centigrade, and a melt point between about 165 and 172 degrees Centigrade. A PVDF resin having a melt viscosity above 13,000 poise tends to be too viscous.

A thermoplastic acrylic resin is a necessary component in the formulation as it acts as a stabilizer and provides other desirable coating characteristics such as less discoloration after baking, less discoloration after exposure to high temperature use conditions, and improved post forming durability. Useful acrylic resins include polymers and copolymers of acrylic acid, methacrylic acid, or esters of these acids. The esters are formed by the reaction of acrylic or methacrylic acid with suitable alcohols, such as methyl alcohol, ethyl alcohol, propyl alcohol, butyl alcohol, and 2-ethylhexyl alcohol. A preferred acrylic resin is a copolymer of methyl methacrylate and ethyl acrylate, such as Acryloid B-44 available from the Rohm & Haas Company.

The PVDF/acrylic resin blend makes up about 60 to 95 percent by weight of the overall coating composition, preferably about 82 to 89%. The weight ratio of PVDF to acrylic can range from about 50:50 to 90:10, more typically 60:40 to 80:20.

The pigment component is made up of at least one pigment. Pigments that have been found useful are those that have been used in PVDF based liquid (water or solvent) coatings. The pigments may be organic or inorganic, but inorganic are preferred due to their resistance to ultraviolet and thermal degradation. For white coatings, a non-chalking, non-yellowing rutile type titanium dioxide is preferred, such as du Pont's Ti-Pure R-960. For other colors, calcined ceramic metal oxide type pigments are useful. Other pigments useful in combination with titanium dioxide include zinc oxide, zinc sulfide, zirconium oxide, white lead, carbon black, lead chromate, calcium carbonate, and leafing and non-leafing metallic pigments. Pigments that are not recommended include cadmiums and lithopones.

The pigment component must be sufficiently present, generally in the range of about 5 to 35 weight percent based on the weight of the coating composition, in order to provide adequate opacity and hiding power. The preferred range is about 10 to 15%. For light colors and those which contain titanium dioxide, the amount may be as high as 35%.

The component discovered to be essential to solve the Orange Peel problem is the fluorinated terpolymer, VDF/TFE/HFP, which is present at a level of from about 0.1 to about 5.0 weight percent, based on the weight of the coating composition, preferably 1–3%. The terpolymer preferably has a melt point between about 85 and 95 degrees Centigrade and a melt viscosity of from about 4000 to 10000 poise at 125 degrees Centigrade (ASTM D3835). The use of this terpolymer has been found to result in a decrease in surface roughness, defects, pin holes, and craters in the final coating.

The powder coating formulation is prepared by mixing the PVDF resin, thermoplastic acrylic, pigment, and terpolymer, pelletizing the mixture to form pellets, and cryogenically grinding the pellets to form a powder particulate. Thus, the formulation blend is typically melt mixed, such as by extrusion with a twin screw extruder operating at a temperature of about 390 to 420 degrees Fahrenheit. The extruded material is then pelletized by conventional techniques. The dimension of the pellet is not critical, but it is preferred that it be uniform and small enough to facilitate handling. The pellets are cryogenically ground into a powder particulate according to conventional techniques. For example, the temperature of the pellets may be lowered for grinding by immersion in liquid nitrogen and the grinding equipment may consist of a hammer mill with a 0.010 inch slotted screen, resulting in a particle size range of about 1 to 70 microns. Liquid nitrogen may be fed into the hammer mill during grinding. The resultant powder can be classified by passing through appropriately sized sieves to separate the desired particles (the desired particle size depends upon the application technique). The particles from 1–10 microns are generally discarded for health reasons.

A target coating thickness is typically 2 mils. To achieve this, the powder is ground and classified to an average particle diameter of about 35 to 45 microns. This average particle diameter range will be adjusted upward or downward for thicker or thinner desired coatings, respectively.

The classified powder may be applied to a substrate such as aluminum by any means suitable for obtaining an even distribution of powder. There are a number of conventional techniques which may be used, such as fluidized bed, thermal spray, or, preferably, electrostatic spray. The powder coating may be applied over the substrate with or without a primer coating. After application of the powder, the coating is subjected to treatment which is sufficient to melt a portion of the powder. Thus, the temperature must be above the melt temperature of the coating formulation, preferably between about 460 and 500 degrees Fahrenheit. The coating and the substrate are then cooled by suitable means.

The practice of the invention is illustrated in the following examples. In these examples, unless otherwise indicated, all percents are weight percent, all temperatures are Centigrade, Walnut Brown #10 is a brown pigment available from Shepherd Color Co., Black 1D is a pigment comprised of oxides of copper and chromium available from Shepherd Color Co., Acryloid B44 is a thermoplastic poly(methylmethacrylate)resin which is a copolymer comprised of 70:30 methyl methacrylate and ethyl acrylate with an approximate molecular weight of 88,000 available from the Rohm & Haas Co., Kynar 710 is a PVDF polymer having a melt viscosity of 6300 poise available from Elf Atochem North America, Inc., and Kynar ADS is a VDF/TFE/HFP terpolymer with a melt point of about 90 degrees and a melt viscosity of about 6000 poise available from Elf Atochem North America, Inc.

EXAMPLE 1

59.5% Kynar 710 resin was added to 25.5% Acryloid B44, 12% Walnut Brown #10, and 3% Kynar ADS. The mixture was blended in a high intensity mixer until a homogeneous blend was obtained. The batch was then melt-compounded on a two roll mill operating at a temperature of 200 degrees and granulated into pellets. The pellets were soaked in liquid nitrogen and cryogenically ground in a hammer mill equipped with a 0.010 inch slotted screen. Liquid nitrogen was fed into the hammer mill during the grinding operation. The resultant powder was then classified using sieves and the powder which passed through 75 micron screen was collected as useful material. This powder was then electrostatically applied to an alodine pretreated aluminum panel. The panel was baked for 15 minutes at 464 degrees (Fahrenheit). The final coating thickness was approximately 2 to 2.7 mils. The resultant coating was smooth and free from poc marks and craters upon observation at 10× magnification.

EXAMPLE 2

The procedure of Example 1 was followed except that the composition was changed to 60.9% Kynar 710, 26.1% Acryloid B44, 12% Black 1D, and 1% Kynar ADS. Again the resultant coating was free of surface defects, poc marks, and craters, and had a smooth surface.

EXAMPLES 9–4 and COMPARATIVE RUNS A & B

Example 1 was repeated with the level of Kynar ADS at 1% (Example 3) and 0% (Run A). Example 2 was repeated with the level of Kynar ADS at 3% (Example 4) and 0% (Run B). In all cases the coatings with Kynar ADS had a better surface appearance than those without ADS, the latter having craters and poc marks down to the bare metal. All samples, with and without Kynar ADS, passed adhesion, direct impact, reverse impact, and solvent resistance tests.

What is claimed is:

1. A solvent free pigmented blend useful for powder coatings comprising a PVDF resin, a thermoplastic resin, a pigment, and about 0.1 to 5.0 weight percent, based on the weight of the blend, of a VDF/TFE/HFP terpolymer.

2. A blend as in claim 1 wherein the terpolymer has a melt point of about 85 to 95 degrees Centigrade.

3. A blend as in claim 2 wherein the PVDF resin has a melt viscosity of about 6000 to 13000 poise.

* * * * *